United States Patent [19]
Muscatell

[11] Patent Number: 5,373,921
[45] Date of Patent: Dec. 20, 1994

[54] HYDRAULIC GEARWHEEL BRAKE PUMP

[76] Inventor: Ralph P. Muscatell, 2007 NE. 20th Ave., Fort Lauderdale, Fla. 33305

[21] Appl. No.: 149,564

[22] Filed: Nov. 9, 1993

Related U.S. Application Data

[63] Continuation-in-part of Ser. No. 982,617, Nov. 27, 1992, abandoned.

[51] Int. Cl.⁵ ............................................. F16D 57/06
[52] U.S. Cl. ..................................... 188/292; 303/10; 303/116.3
[58] Field of Search ............... 188/290–296, 188/274, 264 P, 264 E; 303/10–12, 61, 116.4, 116.3

[56] References Cited

U.S. PATENT DOCUMENTS

| | | | |
|---|---|---|---|
| 1,475,538 | 11/1923 | Bradburn et al. | 188/292 |
| 1,779,639 | 10/1930 | Price | 188/292 |
| 1,782,663 | 11/1930 | Price | 188/292 |
| 1,821,178 | 9/1931 | Fisher | 188/292 |
| 2,007,279 | 7/1935 | McCleary | 188/292 |
| 2,023,533 | 12/1935 | Lilly | 188/292 |
| 2,152,570 | 3/1939 | Scates | 188/292 |
| 2,179,540 | 11/1939 | Burdick | 188/292 |
| 2,496,042 | 1/1950 | Dikeman | 188/292 |
| 2,845,149 | 7/1958 | Stern et al. | 188/292 |
| 2,910,146 | 10/1959 | Peterson | 188/292 |
| 2,956,647 | 10/1960 | Bartholomaus | 188/290 |
| 3,381,781 | 5/1968 | Summerville, Jr. | 188/290 |
| 3,640,587 | 2/1972 | Milner et al. | 303/116.3 |
| 4,070,070 | 1/1978 | Eggers | 303/116.3 |
| 4,695,100 | 9/1987 | Miles | 303/10 |
| 5,201,570 | 4/1993 | Heren et al. | 303/10 |

FOREIGN PATENT DOCUMENTS

| | | | |
|---|---|---|---|
| 454445 | 2/1949 | Canada | 188/292 |
| 194320 | 5/1938 | Switzerland | 188/292 |

*Primary Examiner*—Douglas C. Butler
*Attorney, Agent, or Firm*—Oltman and Flynn

[57] ABSTRACT

According to the invention there is provided a hydraulic brake coupled to a rotary shaft. It includes a hydraulic pump connected to the shaft, the pump having a pump inlet, and a pump outlet, a hydraulic loop having an inlet part connected to the pump outlet and an outlet part connected to the pump inlet, a flow control device positioned in the hydraulic loop between the inlet part and the outlet part for controlling flow of hydraulic fluid in the hydraulic loop, and a brake actuator connected to the flow control device for reducing the flow of hydraulic fluid in response to operation of the brake actuator. The pump is advantageously a gearwheel pump, and may include a gearwheel housing having one side formed as a flow-control plate.

6 Claims, 11 Drawing Sheets

HYDRAULIC GEARWHEEL BRAKE PUMP

This application is a continuation-in-part application of Ser. No. 07/982,617 filed Nov. 27, 1992 now abandoned.

The invention relates to an automotive braking system for braking rotating wheels of an automobile, and more particularly to a braking system using a hydraulic fluid as the braking medium, wherein the rotating wheel is connected to a hydraulic pump that circulates the fluid through a proportional control valve linked to a brake lever.

BACKGROUND AND PRIOR ART

The braking systems of the known art are composed of brake shoes with a brake lining of compressed asbestos in a matrix of binding material that operate on a brake drum or brake disc. The conventional brakes are subject to wear, and the wear products introduce hazardous materials into the environment. The brake drum or disc is also subject to wear, and requires periodic machining or replacement in order to restore braking. The conventional brakes also suffer from the drawback that they lose braking effect if they get wet, and they get very hot after prolonged hard braking. Conventional brakes also tend to "fade" after prolonged hard braking.

It is accordingly an object of the present invention to provide a braking system that does not have the drawbacks of the existing braking systems, such as wear, susceptibility to overheating and fading after long braking, and loss of friction when exposed to wetness.

Applicant is unaware of any pertinent prior art relating to the invention.

SUMMARY OF THE INVENTION

According to the invention there is provided a hydraulic brake coupled to a rotary shaft. It includes a hydraulic pump connected to the shaft, the pump having a pump inlet, and a pump outlet, a hydraulic loop having an inlet part connected to the pump outlet and an outlet part connected to the pump inlet, flow control means disposed in the hydraulic loop between the inlet part and the outlet part for controlling flow of hydraulic fluid in the hydraulic loop, and a brake actuator connected to the flow control means for reducing the flow of hydraulic fluid in response to operation of the brake actuator.

According to a further feature, there is provided a hydraulic brake wherein the hydraulic pump includes at least one pump cylinder, a pump piston in the pump cylinder, a one way inlet valve in the pump cylinder fluidly communicating with the hydraulic loop outlet part, a one way outlet valve in the pump cylinder fluidly communicating with the hydraulic inlet part, reciprocating means in operative engagement with the pump piston for reciprocatingly moving the pump piston in the pump cylinder, and wherein the reciprocating means are coupled to the rotary shaft.

According to still another feature, the hydraulic brake includes in the reciprocating means a camshaft, at least one eccentric cam on the cam shaft in operative engagement with the pump piston for driving the pump piston into the pump cylinder with each revolution of the camshaft.

According to a further feature, the flow control means include a fluid flow control valve, a flow control cylinder, a flow control piston slidably disposed in the flow control cylinder, brake linkage means for linking the brake actuator with the flow control piston, and wherein the flow control valve includes a flow control aperture, and a conical projection aligned with the flow control aperture, the conical projection extending from the flow control piston toward the flow control aperture.

According to an additional feature, the hydraulic pump includes a plurality of hydraulic cylinders, an equal plurality of camshafts, each camshaft having a respective cam, wherein the cams are angularly off-set from each other by equal angles, and gearwheel means for mutually locking the camshafts into equal angle positions.

According to still another feature, the brake linkage means include a hydraulic brake master cylinder, a brake master piston slidably disposed in the brake master cylinder, and multiple hydraulic brake lines fluidly connecting the brake master cylinder with multiple hydraulic lock units for actuating the fluid flow control pistons in a plurality of hydraulic brakes in response to operation of the brake actuator. This feature causes equalization of the fluid pressure in all commonly connected flow control pistons of the brake pumps.

The hydraulic brake according to the invention may include a hydraulic fluid tank fluidly communicating with the brake master cylinder, for supplying hydraulic fluid to the brake master cylinder, and the hydraulic pump may include a plurality of hydraulic cylinders, an equal plurality of eccentric cams, wherein the eccentric cams are disposed on a common camshaft, and wherein the eccentric cams are angularly off-set from each other by equal angles.

The hydraulic brake according to the invention may alternatively include a gearwheel pump, the gearwheel pump including a gearwheel housing having a recess and at least two meshing gearwheels disposed in the gearwheel housing recess, wherein the housing includes a main housing part wherein the recess is formed; and further including plate control means which include an adjustable flow control plate separable from the main housing part, adjustably spaced apart from the gear wheels and the gear wheel main housing part for adjustably controlling fluid flow in the gearwheel pump. The gearwheel pump may further include brake control linkage coupling a brake actuator to the flow control plate, the brake control linkage including a hydraulic brake master cylinder, a brake master piston slidably disposed in the brake master cylinder, the master piston being coupled with the brake actuator; at least one plate control cylinder, a plate control piston slidably disposed in the plate control cylinder, the plate control piston operatively engaging the flow control plate.

The gearwheel pump may further include a hydraulic fluid flow rectifier fluidly communicating with the flow control means for providing braking in both forward and reverse direction of the wheel to be braked. The gearwheel pump may also include a fluid flow control valve.

Further objects and advantages of this invention will be apparent from the following detailed description of a presently preferred embodiment which is illustrated schematically in the accompanying drawings.

DESCRIPTION OF THE PREFERRED EMBODIMENT

Figure 1:
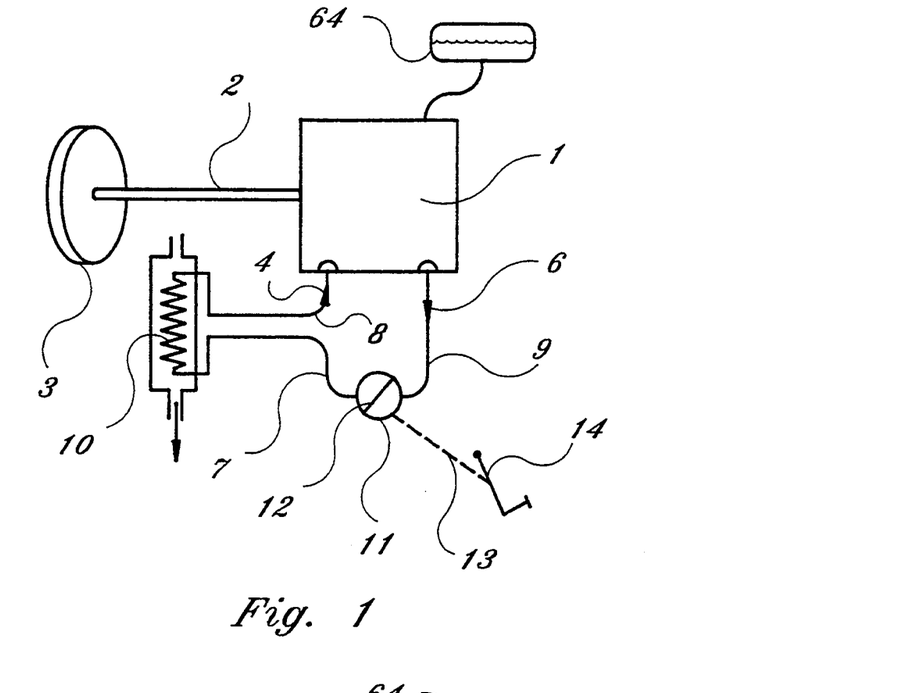
FIG. 1 is a diagrammatic view of the invention in its most basic form.

In FIG. 1 a brake system according to the invention is composed of a hydraulic brake pump 1 connected to a rotary shaft 2, which supports a wheel 3 of, for example, an automobile which needs to be connected with a braking device. The hydraulic pump 1 has a pump inlet 4 and a pump outlet 6 connecting the pump 1 with a hydraulic loop 7, having a loop outlet part 8 connected with the pump inlet 4 and a loop inlet part 9 connected with the pump outlet 6. A hydraulic flow control device 11 inserted in the hydraulic loop 7 has a flow control element 12 coupled via suitable brake linkage 13 to a brake actuator 14.

The brake actuator 14 is typically a brake pedal of an automobile.

The hydraulic brake pump 1 may be of a construction known, for example, as a piston pump, which can have any number of pistons, or a rotary hydraulic pump, known, for example, as a gearwheel pump or a vane pump.

The brake system according to FIG. 1 may advantageously include a hydraulic fluid cooler 10 connected to the hydraulic loop 7, wherein the hydraulic fluid can be cooled in case prolonged heavy braking is required. In such cases the hydraulic fluid can become overheated and external cooling may be required.

A hydraulic fluid tank 64 supplies hydraulic fluid to the braking system to replace fluid loss through evaporation and leakage.

Figure 2:
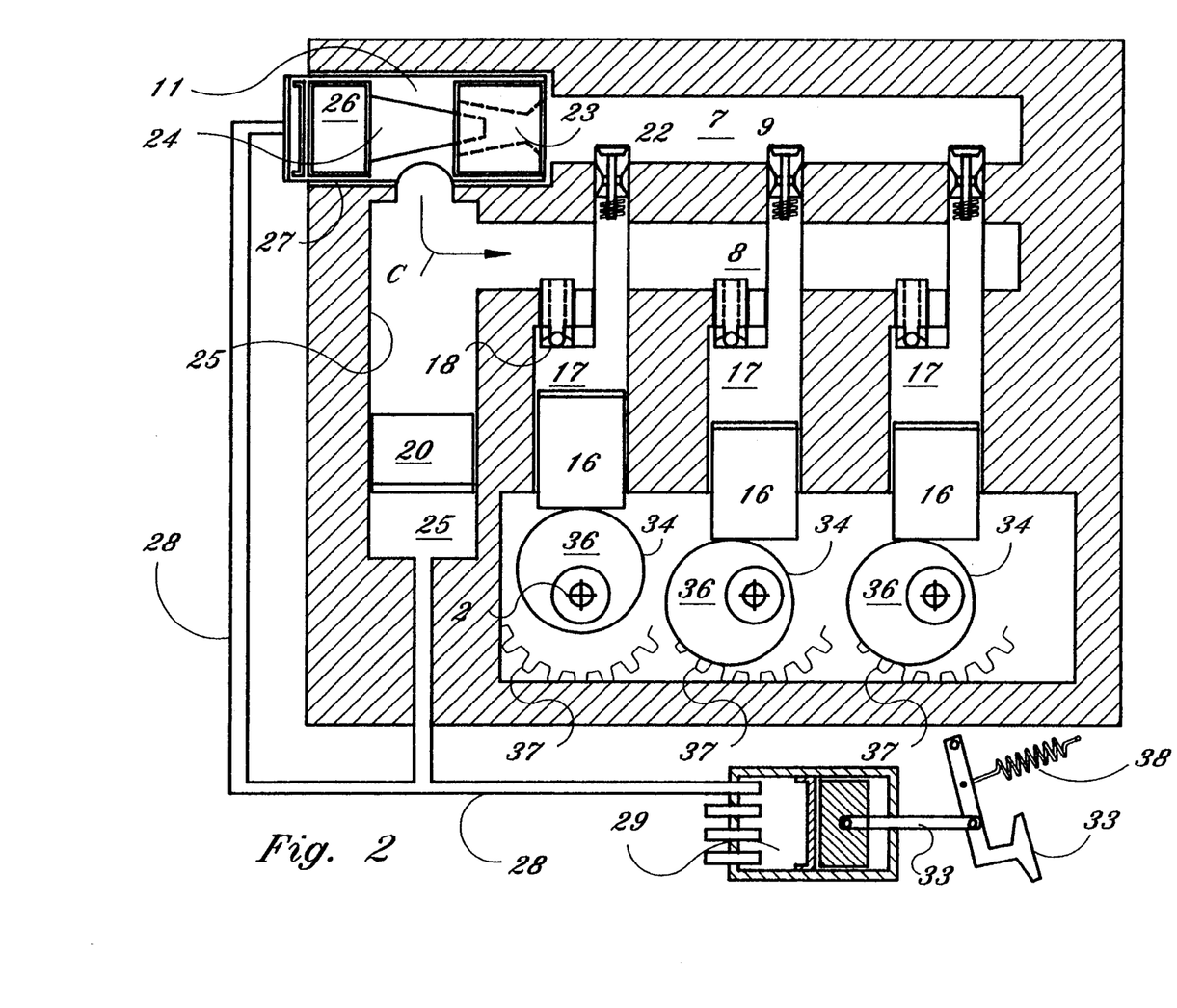
FIG. 2 is a cross-sectional elevational view of the invention in the form of a hydraulic pump having reciprocating pistons.

FIG. 2 shows the pump 1 in the form of a piston pump having, for example, three pump pistons 16 each reciprocatingly contained in a respective pump cylinder 17. Each cylinder 17 is connected via a one-way intake valve 18 with the outlet part 8 of the hydraulic loop 7, and via a one-way outlet valve 22 with the inlet part 9 of the hydraulic loop 7. The respective hydraulic loop inlet and outlet part 9, 8 are connected via the flow control device 11, which is illustrated as a modified needle valve.

It follows that the flow control device may be realized as any of a number of conventional fluid control valves.

The flow control valve 11 has a flow control aperture 23 aligned with a circular conical projection 24 mounted on a flow control piston 26, slidably contained in a flow control cylinder 27. The flow control cylinder 27 is connected via an intermediate cylinder 25 and an intermediate piston 20 slidably disposed in the intermediate cylinder 25, and a hydraulic brake line 28 with a brake master cylinder 29, containing a brake master piston 31, which is in turn connected via brake connecting rod 32 with a brake actuator 33, e.g. in the form of an automotive brake pedal 33.

Each pump piston 16 is in contact with a respective circular eccentric cam 34. The eccentric cams 34 are mutually off-set by equal angles, i.e. in this example by 120 degrees angle. Each cam 34 is mounted on respective shaft sections 36, one of which is connected with the rotary shaft 2 (FIG. 1), and are mutually locked by means of respective meshing gear wheels 37 shown only partially for the sake of clarity. In their extended operative positions, the pump pistons 16 are driven in reciprocating motion by cams 34 in their respective cylinders 17, causing hydraulic fluid to be pumped in circulating flow direction, indicated by arrow C through the flow control device 11. As a result of operating the brake actuator 33 fluid pressure acts on the flow control piston 26. This causes the conical projection 24 to be driven against the flow direction of fluid being pumped through the aperture 23, thereby throttling down the flow of fluid through the hydraulic loop 7, and causing the pump to exert a braking action on the shaft 2. The circulating fluid applies back pressure on the flow control piston 26, which is transmitted back to the master piston as a reactive force that is sensed by the person operating the brake actuator 33.

The fluid transmitted during braking from the master cylinder, forcing intermediate piston 20 upward, causes the volume of fluid contained in the hydralic loop 7 and in the pump cylinders 17 to be displaced as the pump pistons 16 are driven downward into engagement with the eccentric cams 34. Therefore the pump pistons 16 are only in engagement with the eccentric cams 34 during braking, while during non-braking conditions the pump pistons are retracted into the pump cylinders 17 without causing drag on the shaft 2.

Figure 3:
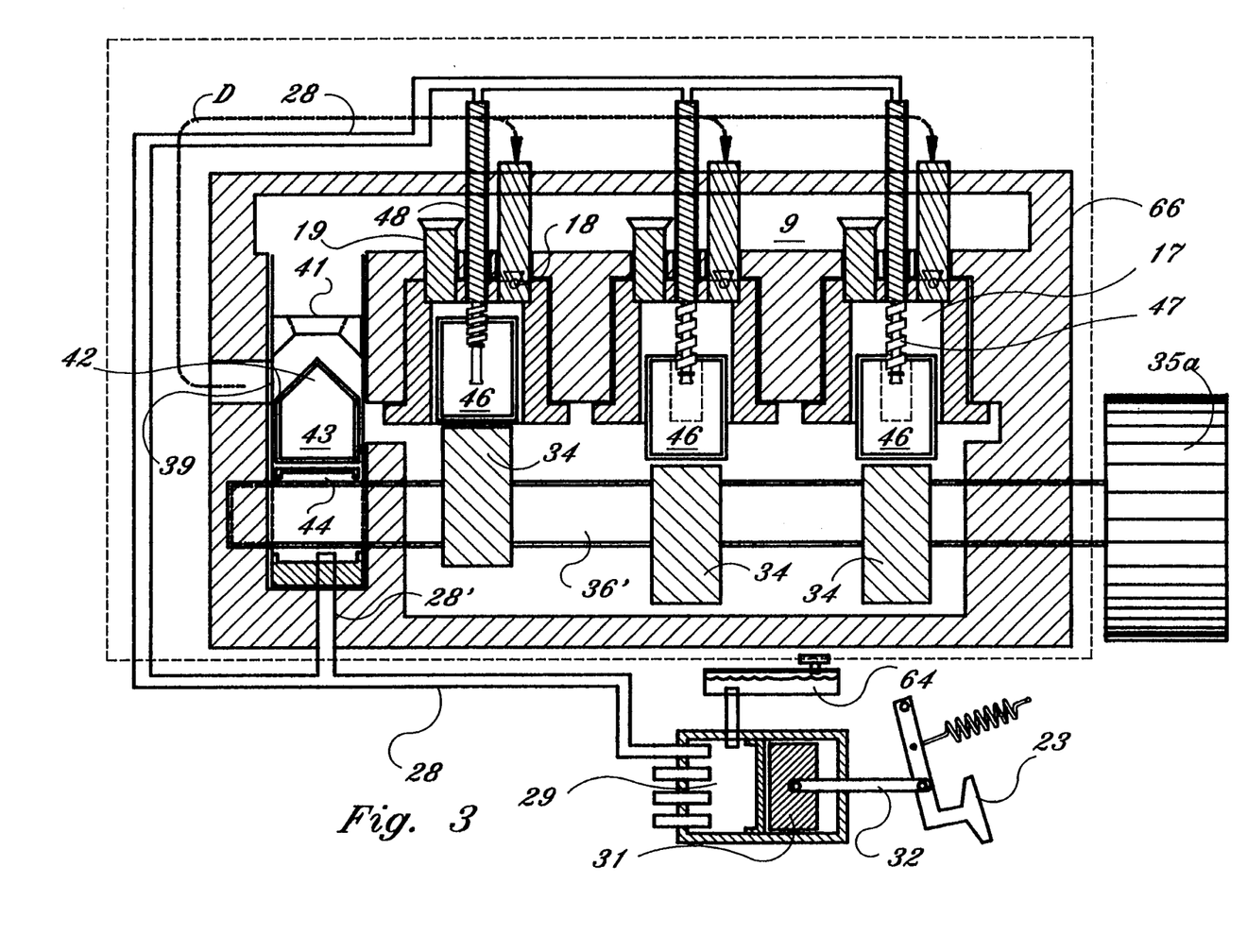
FIG. 3 is a cross-sectional elevational view of the invention in the form of a hydraulic pump having spring-biased hydraulic pistons.
Figure 6:
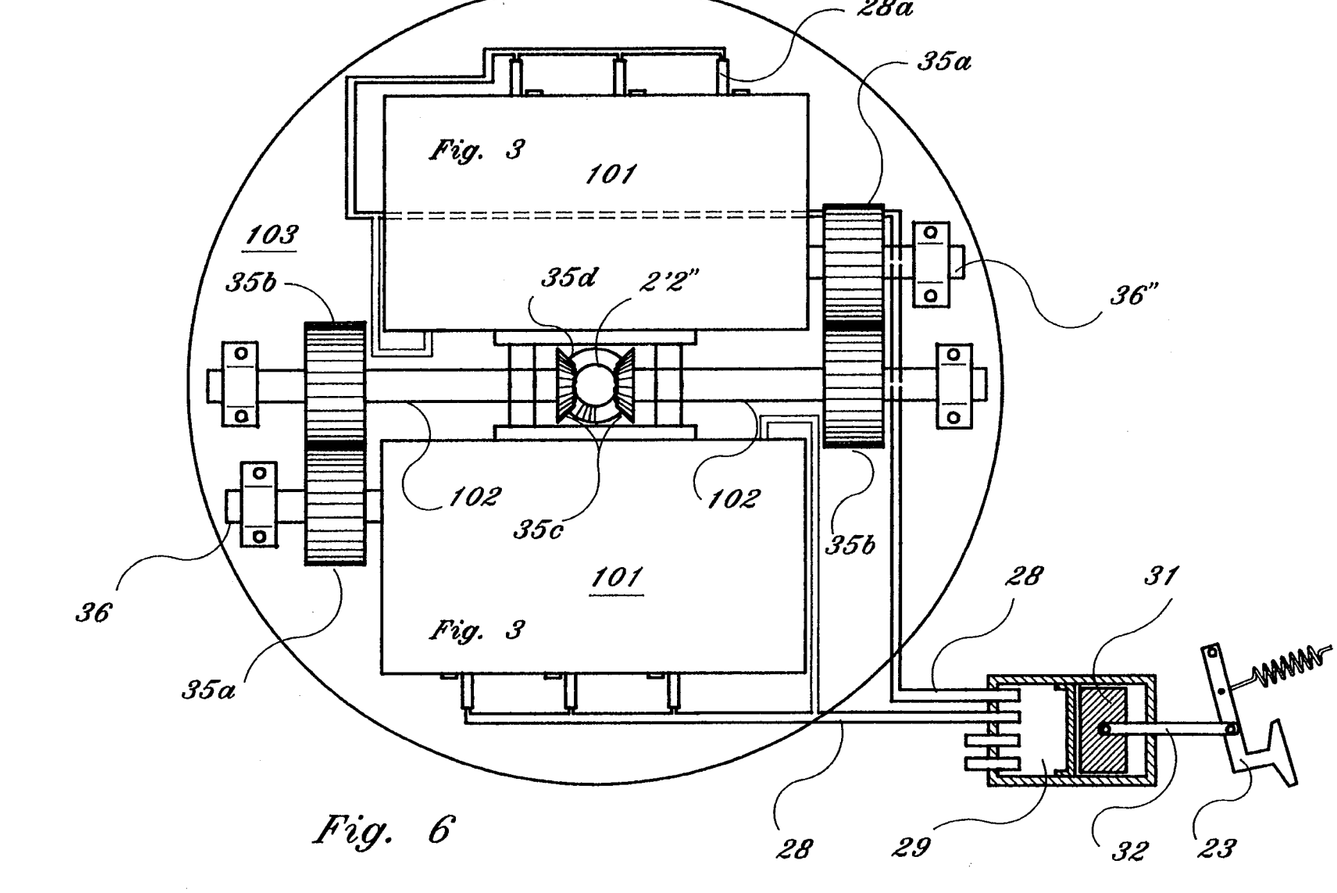
FIG. 6 is a diagrammatic elevational view of two brake pumps in a common fluid-filled enclosure, commonly connected to a wheel shaft.
Figures 11, 12:
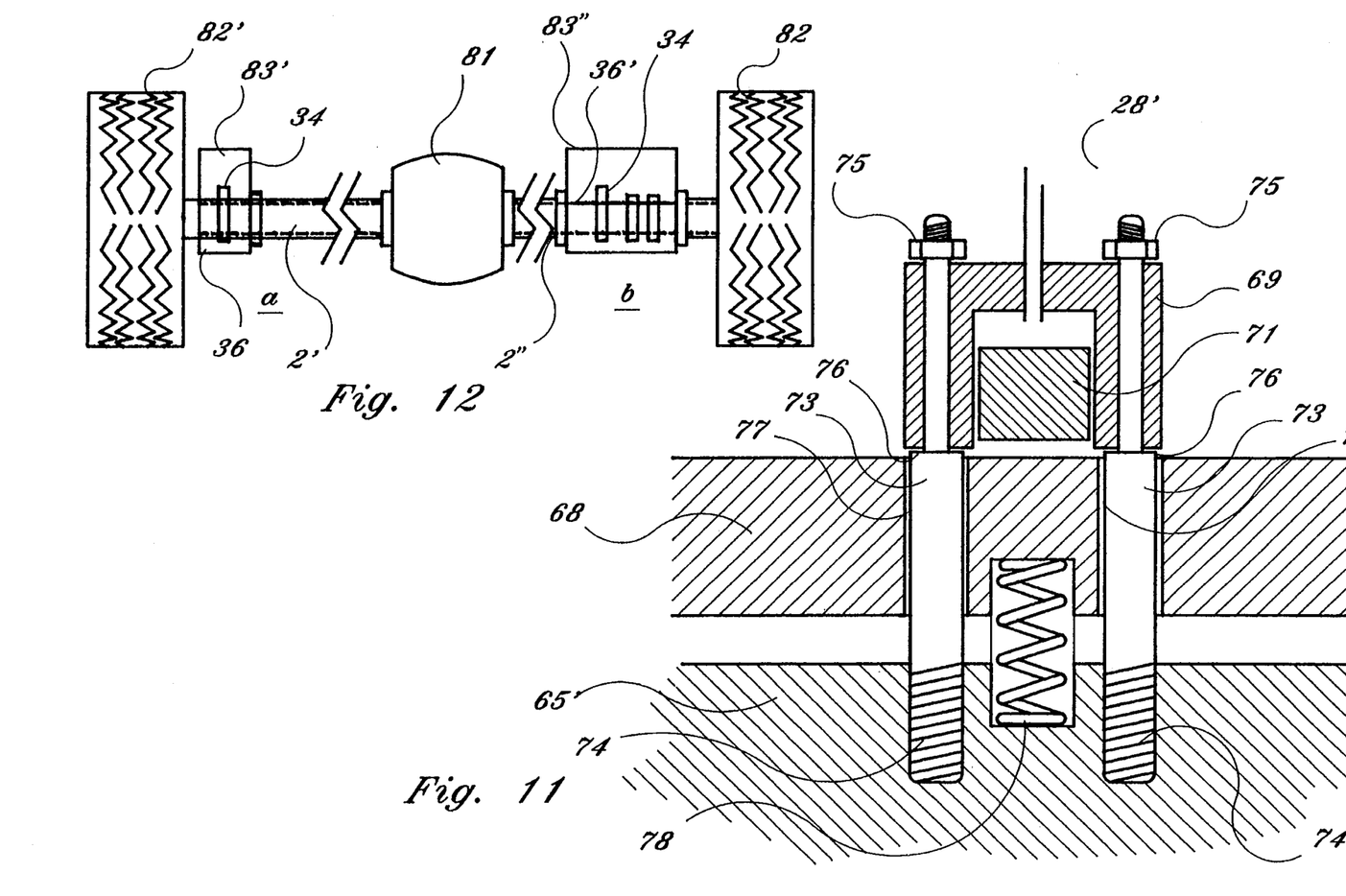
FIG. 11 is a fragmentary diagrammatic view of the gearwheel pump according to FIG. 9, showing a plate control piston engaging the transversely movable flow control plate.
FIG. 12 is a diagrammatic elevational view of a vehicular drive axle, showing a differential and two hydraulic brake pumps.

FIG. 6 shows two piston pumps, e.g. of the type shown in FIG. 2 or 3, disposed at the end of a motor vehicle axle 2',2''. As is typical in the present art, the vehicle axle shaft is seen at 2', 2'' (FIG. 12). A 90 degree coupling is made by 45 degree bevel gears 35c,35d. These gears are mounted in a support framework which is affixed to a back plate 101 of the pumps. By means of the respective shafts 102 and coupling gears 35a,35b the driven gear 35a of the hydraulic lock mechanism(s) is (are) engaged with the vehicle wheel axle 2′,2″. As the wheel axle 2′,2″ turns, so turns the hydraulic lock mechanism(s). As the free turning of the hydraulic pumps are restricted in rotation or stopped so also is the vehicle axle, and wheels are slowed or stopped.

The entire pump arrangement is advantageously constructed as a single fluid filled enclosure or housing that also forms the inlet and outlet portions of the circulating loop, as seen in FIG. 2.

Referring to FIG. 3, the pump 1 is coupled to the vehicle axle by the driven gear 35a. The driven gear 35a drives the pump shaft 36′ which supports full circle eccentric cams 34. In a no-braking condition the eccentrics push pump pistons 46 to the top of cylinders 17 where they come to rest. The eccentrics, shaft, driven and coupling gears then rotate 'free wheel' with the vehicle in motion. As the pump pistons 46 are not caused to reciprocate in the free-wheeling state, minimum operational drag results.

When braking effect is desired, the hydraulic brake system is actuated. A conventional master cylinder 31 and foot pedal 23 transmits fluid pressure via hydraulic pipes 28 simultaneously to the piston control springs 47 (FIG. 4) and to the flow control valve 39. With increasing pressure the piston control springs 47 are pressed against the pistons 46 forcing them to follow the eccentrics 34 and cycle up and down. With increasing pressures from the brake actuator 23, the piston control springs 47 will cause the pistons 46 to follow the eccentrics 34.

As the main pump pistons 46 cycle up and down they alternately draw in and expel hydraulic fluid via inlet valve 18 and outlet valves 19. Ball and seat valves are used for the inlet and flapper valves for the outlets (FIG. 3). The valves insure that fluid flows from the outside, symbolically indicated by dashed line D which is space defined by the dash-dot line 66, into the cylinder 17 on the downstroke of the main piston 46 via the inlet valve 18 and thence on the upstroke out the outlet valve 19. The three eccentrics 34 are angularly spaced at 120 degrees and therefore at least one piston is always on the upstroke.

Simultaneously the brake system is, via the foot pedal, causing the flow control valve 39 to close. The flow control valve 39 controls the exit of the hydraulic fluid from the pump inside space. As the fluid flow is so restricted, the pump pistons on the upstroke are impeded; a braking effect results. When the control valve is closed completely the hydraulic fluid cannot circulate out of the pressure chamber, thus the pistons are stopped causing hydraulic lock, and the vehicle wheels stop.

The control valve 39 is comprised of a plunger 43 and seat 41 so arranged that the plunger 43 must move directly into and against the fluid outflow. Thus pressures from the master cylinder system acting back on the foot pedal must overcome outflow pressures from the pressure chamber. These pressures are generated by the inertial energy of the motion of the vehicle. The brake system must meet—balance—and exceed these generated pressures resulting from vehicle motion. Thus the mechanism is pressure reactive. The amount of braking is proportional to the amount of pressure the operator applies to the brake pedal. This is one object of the invention.

An alternate version is presented in FIG. 2. It offers more direct and simpler gear coupling to the vehicle axle. It also offers a simpler means of controlling the main pump pistons, the hydraulic fluid is contained within the pump.

Most of the same parts as are presented in FIG. 3 are incorporated in FIG. 2. Pump pistons, cylinders, eccentrics, pressure chamber and remotely operated control valve are retained. The hydraulic actuator/control spring is not used and a 'displacement control' piston 20 and cylinder 25 are added.

The eccentrics are three in number and each mounted on a respective gear driven shaft. The shafts are emplaced parallel on a horizontal line and aligned with a front to rear axis. The gears linking each of these shafts are on the rear side as seen in partial phantom.

FIG. 3 shows an embodiment wherein the eccentric cams 34 are mounted on a common shaft 36′. Each pump cylinder 17 has a one-way inlet valve 18 and a one-way outlet valve 19 as in FIG. 2. The inlet valves 18 are commonly connected to the outlet part of the hydraulic loop, indicated in FIG. 3 only by the dashed line arrow D, which is connected with the inlet part 9 of the hydraulic fluid loop. The entire pump is advantageously enclosed in a fluid-filled fluid enclosure 66 (FIG. 6), also indicated by dash-dot line 66 in FIG. 3. The fluid enclosure 66 provides cooling for the circulating fluid. The fluid flows through the flow control valve 39, which is composed of a valve seat 41 with a flow control aperture 42, and a flow control piston 43 slidably contained in a flow control cylinder 44, connected with the brake line 28 via a brake line branch 28′.

Figure 4:
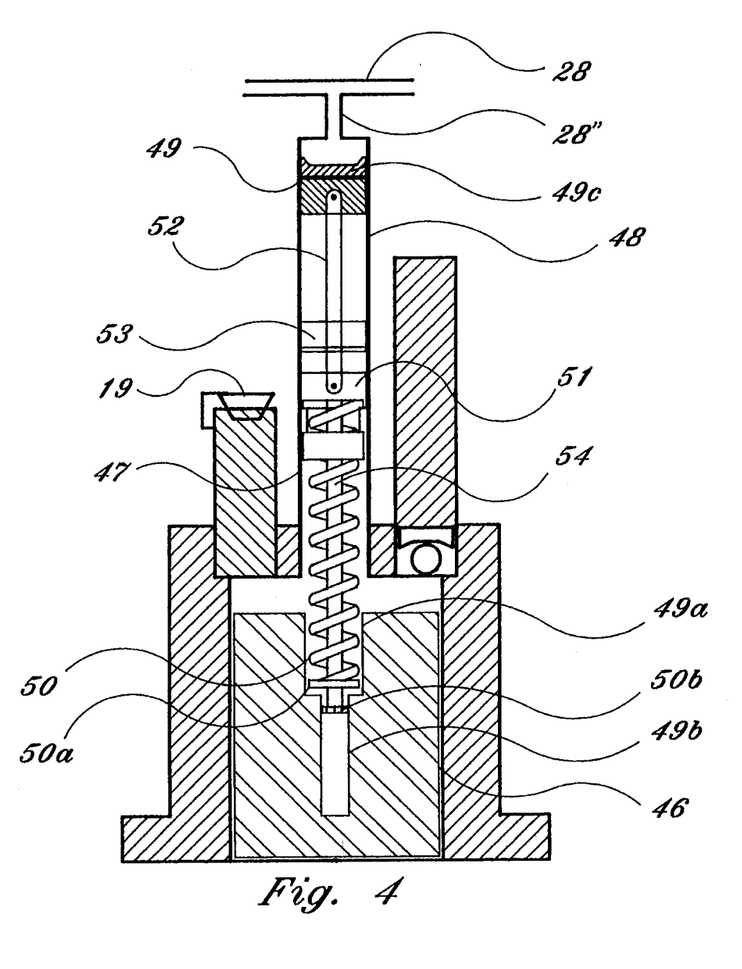
FIG. 4 is a fragmentary elevational detail view of a single pump cylinder and a spring biased pump piston of FIG. 3.
Figure 5:
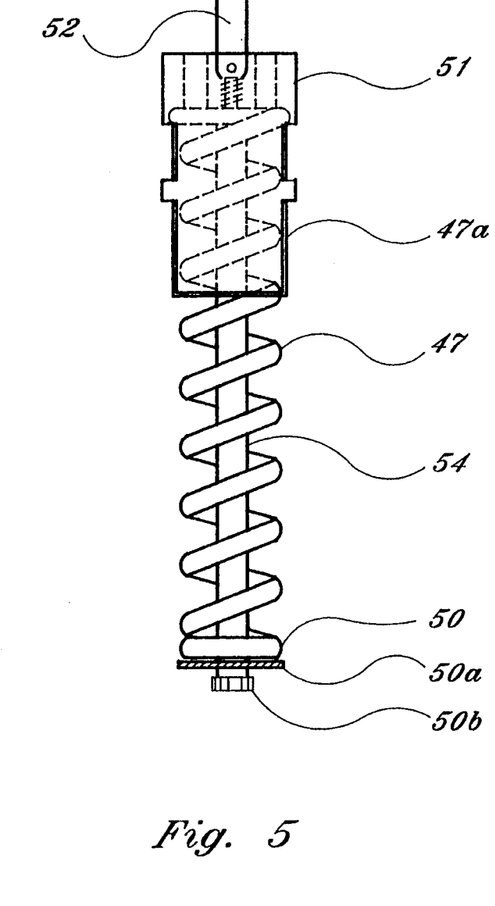
FIG. 5 is a detail elevational view of one of the piston springs of FIG. 4.

Each pump cylinder 17 contains a reciprocating pump piston 46, that is different from the pump piston 16 in FIG. 2 in that it includes a piston control spring 47, seen in more detail in FIGS. 4 and 5. The control spring 47 is formed as a helical compression spring having a lower end 50 (FIG. 4) seated in a spring recess 49a in the upper end of the piston 46. The control spring 47 is enclosed in a spring housing 48, which also contains a spring retaining slide piston 49 slidably disposed in spring housing 48 sealed by a piston seal 49c, and connected via piston rod 52 with a brake control piston 51. A sealed cover plate 53 has a central hole for admitting the piston rod 52. A spring rod 54 is threaded through the piston control spring 47 and through an end plate 50a, with a center hole for admitting the spring rod 54. The spring rod is terminated in an end stop 50b that retains the end plate 50. The end plate 50a maintains the control spring 47 in a tensioned state. The upper end of the spring housing 48 is connected to a branch 28″ of the brake line 28 connected to the brake master cylinder 29.

The hydraulic lock pump units 101 depicted in FIG. 6 are intended to be mounted on a backing plate having a sealed opening for receiving vehicle axle 2′,2″ coupled to the vehicle wheels by gear wheels 35a,35b. The pumps 101 are immersed in hydraulic fluid contained in enclosure 66 having a suitable cover.

Returning now to FIG. 4 and 5, a recess 49b in the upper end of piston 46 extends downward from recess 49a into the piston 46 to receive the end stop 50b of spring rod 54 when the control spring 47 is in its compressed state. In operation, when brake fluid pressure is applied via hydraulic lines 28,28″ from master cylinder 29, the fluid pressure acts on slide piston 49 to extend the pump piston 46 until it engages the associated eccentric cam 34, and the pump piston starts to reciprocate and circulate fluid through the hydraulic loop indicated by dashed line D in FIG. 3 under control of flow control valve 39.

FIG. 5 shows further details of the piston control spring 47 and its connected parts including a spring retaining piston 47a, the end plate 50a, which has a center hole admitting spring rod 54, terminated in the end stop 50b. When brake pressure is applied from hydraulic line 28'', slide piston 49 connected with brake control piston 51 moves downward causing control spring 47 to engage pump piston 46, which is forced downward to engage its respective eccentric cam 34 (FIG. 3).

The advantage of the slide piston arrangement shown in FIGS. 4 and 5 is that during non-braking conditions, when no hydraulic brake pressure is applied via brake lines 28,28'', the pump piston 46 remains retracted inside the pump cylinder 46 without engaging the respective eccentric cam 34. As a result, minimal drag is applied to the wheels. When brake pressure is applied, the slide piston 49 is activated and drives via compression spring 47 the pump piston out of pump cylinder 46 into engagement with eccentric cam 34. As a result, pump piston 46 starts to reciprocate, pumping hydraulic fluid through the hydraulic loop shown by dotted line D in FIG. 3. The pumped fluid flow is controlled by flow control valve 39, which responds to brake fluid pressure to constrain fluid flow in proportion with the amount of brake pressure being applied.

Figure 7:
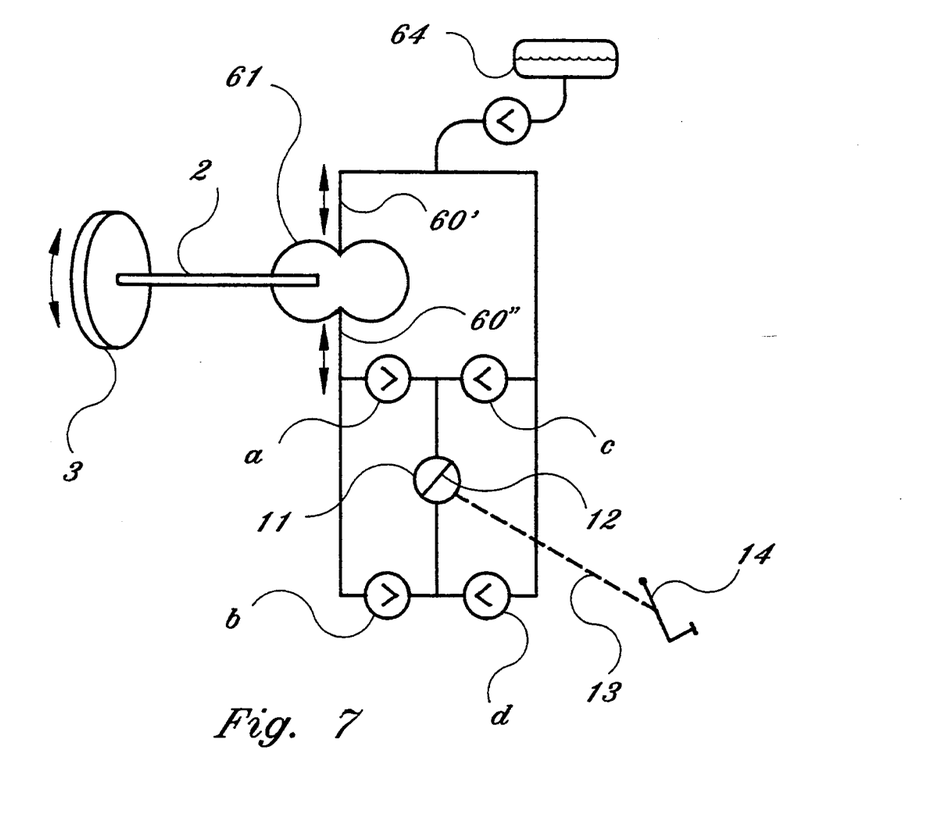
FIG. 7 is a diagrammatic elevational view of an embodiment having a gearwheel hydraulic pump arranged with valves for both forward and reverse braking.

FIG. 7 shows in diagrammatic form a hydraulic braking system according to FIG. 1, wherein the hydraulic brake pump 61 is configured as a gearwheel pump 61 connected by shaft 2 to vehicle wheel 3. The gearwheel pump 61 has two complementary ports 60' and 60'', each of which may be an outlet or inlet port depending on the direction of rotation of wheel 3. A flow control device 11 controls fluid flow under control of a flow control element 12 connected via linkage 13 to a brake actuator 14, as shown also in FIG. 1. In order to provide braking in either direction of rotation of wheel 3, four one-way fluid valves a,b,c,d, are connecting the flow control device 11 with ports 60' and 60'' such that the direction of fluid flow through device 11 always takes place in the same direction as indicated by arrow F.

Figure 8:
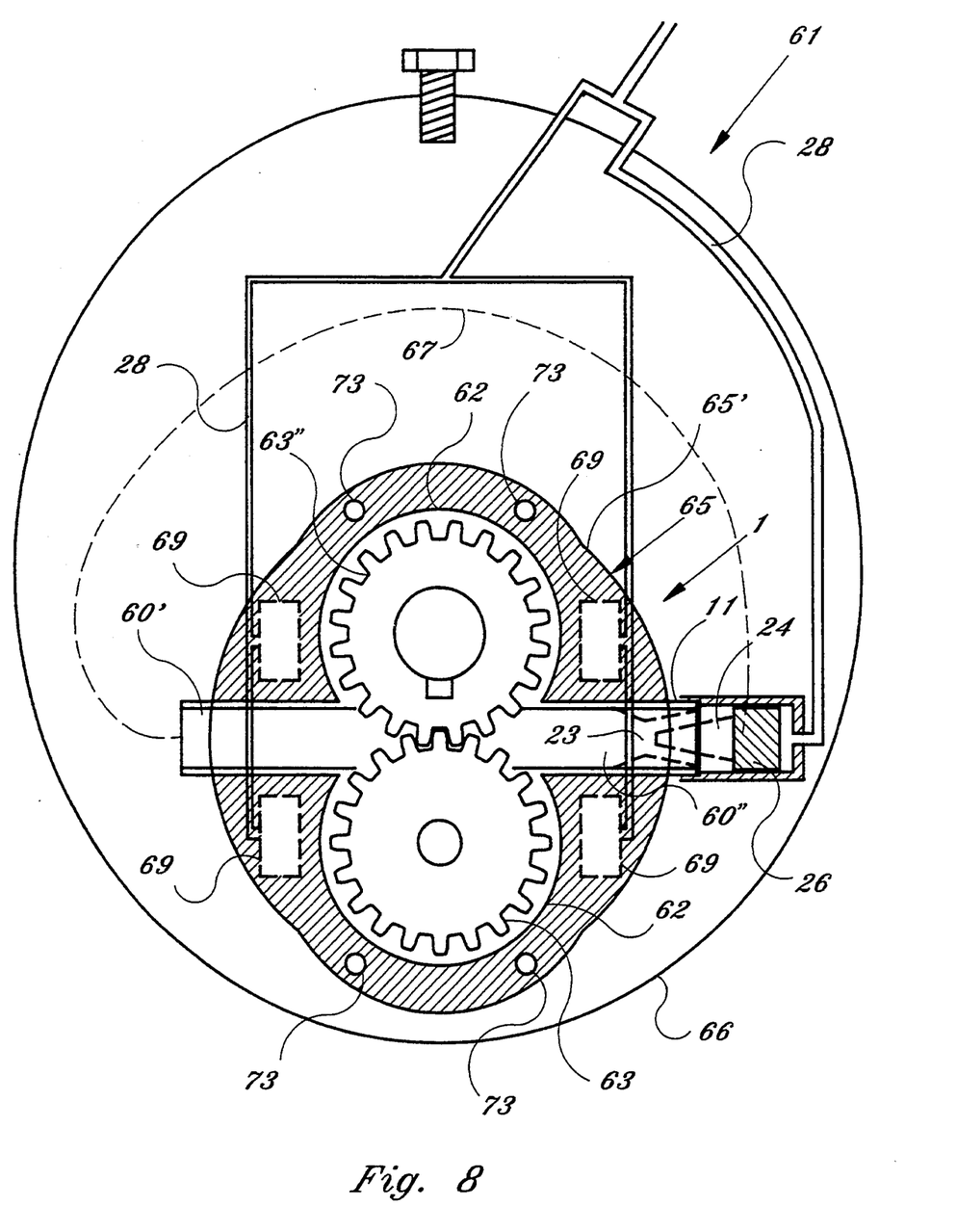
FIG. 8 is a diagrammatic elevational view of an embodiment seen along line 8—8 of FIG. 9, having a gearwheel pump with the housing enclosed in a fluid-filled pump enclosure.

FIG. 8 shows further details of the gearwheel pump 61 of FIG. 7, wherein two meshing gear wheels 63' and 63'' are seated in conforming recesses 62 in a substantially planar gearwheel housing main part 65' of a gearwheel housing 65, as in a conventional gearwheel pump. The gearwheel pump 61 has two ports 60' and 60'' as shown in FIG. 7 connected by a flow control device 11 of conventional or the same construction as flow control device 11 in FIG. 2, and similarly has a flow control piston 26 in a flow control cylinder 11a, having a conical projection 24 in alignment with a flow control aperture 23, so that fluid flow can be controlled by fluid pressure in a hydraulic brake line 28 connected with a brake master cylinder 29 as shown in FIG. 2.

In a further improved version of the gearwheel pump the housing 65 is enclosed in a pump enclosure 66 which is completely filled with hydraulic fluid and provides fluid flow, as indicated by the dashed line 67 between pump ports 60' and 60'' via flow control device 11. The walls of the enclosure 66 provide cooling for the hydraulic fluid.

Figure 9:
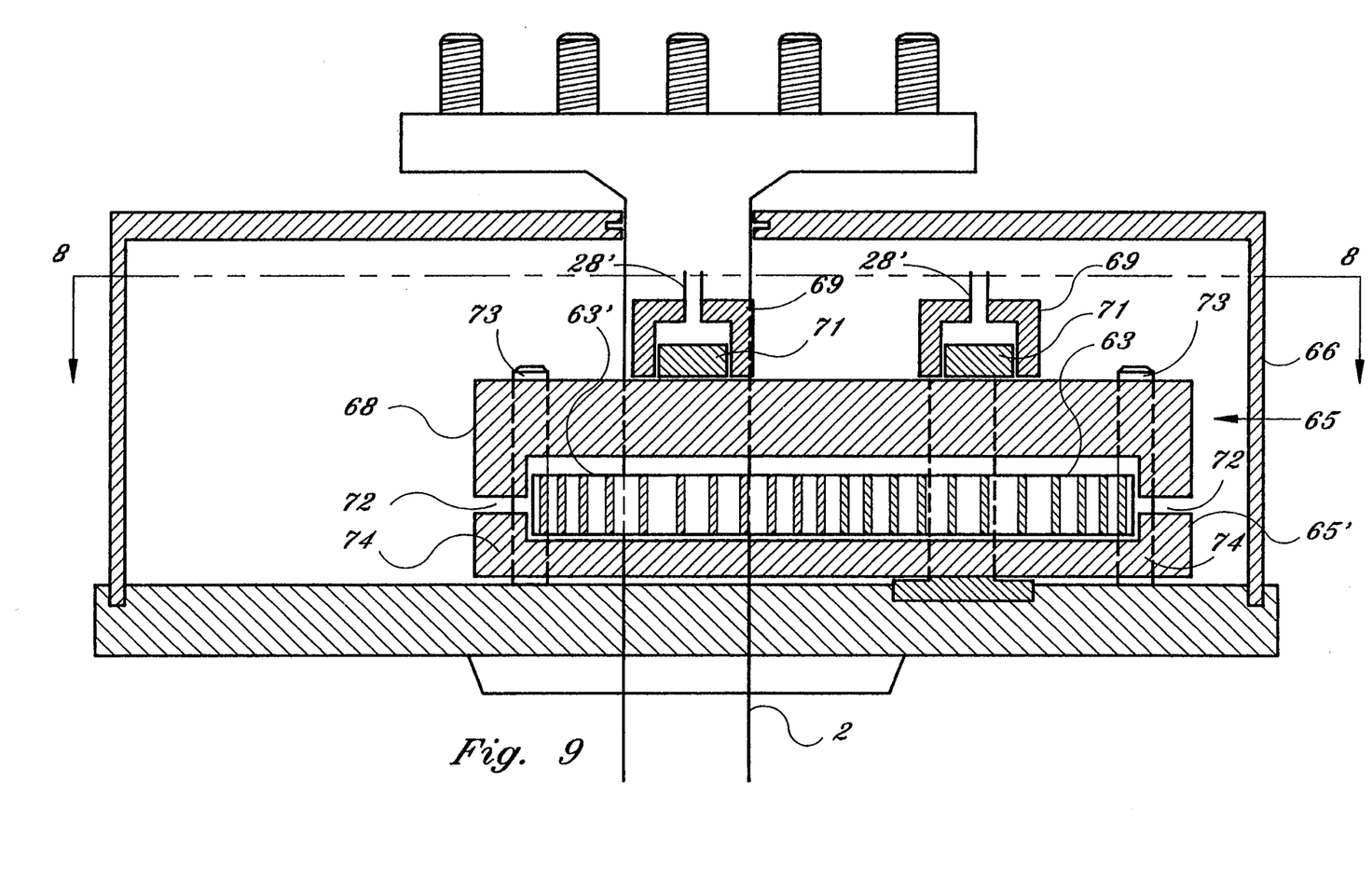
FIG. 9 is a diagrammatic cross-sectional view of the gearwheel pump according to FIG. 8, showing the gearwheel pump housing having a transversely movable flow control plate.

In a further improvement of the gearwheel pump 61, shown in more detail in FIG. 9, one side wall 68 of the housing 65 operates as an adjustable fluid flow control plate, and is movable transversely to the housing main part 65' under control of at least one hydraulic plate control cylinder 69 containing a plate control piston 71 connected by a fluid brake line section 28' via brake line 28 with the brake master cylinder 29 (not shown in FIG. 8 and 9). The plate control piston 71 is in direct engagement with the flow control plate 68.

FIG. 9 shows the gearwheel pump of FIG. 8 in the non-braking, i.e. inactive, condition with the movable flow control plate 68 spaced away by an adjustable spacing 72 from the gearwheel housing main part 65', allowing the gearwheels 63', 63'' to rotate with the drive shaft 2 without any fluid drag on the shaft 2, since the adjustable spacing 72 between the housing main part 65' and flow control plate 68 allows hydraulic fluid to bypass, i.e. circulate freely around the gearwheels 63', 63'', within the walls of the enclosure 66.

When braking is required, hydraulic fluid pressure is applied from the master cylinder 29 via brake line 28, 28' to the control plate pistons 71, which forces the flow control plate 68 toward the gearwheel housing main part 65', reducing the spacing 72, thereby initiating pump function and fluid flow. At the same time brake fluid pressure is applied to the flow control piston 26 (FIG. 8) which starts to reduce the fluid flow between ports 60' and 60''. At the maximum braking force, all fluid flow through the gearwheel pump is stopped and shaft 2 is braked to a complete stop. At the same time maximum back pressure is applied to the brake pedal 14 so that the driver of the vehicle has a tactile feedback indicating to the driver the amount of braking force being applied.

In order to maintain the movable flow control plate 68 in alignment parallel with the housing main part 65' and gearwheels 63' and 63'' a number of indexing pins 73 are provided. The indexing pins 73 are advantageously secured at one end 74 to the housing main part 65', extending perpendicularly thereto through snugly fitting holes in the movable flow control plate 68.

FIG. 11 shows further details of the indexing pins 73 and the control arrangement for the flow control plate 68, wherein two indexing pins 73 are threadedly secured at their lower ends 74 in the housing main part 65', and are at their upper ends adapted to secure by nuts 75 a plate control cylinder 69 against shoulders 76 formed in the index pins 73. The index pins 73 are received in snugly fitting holes 77 in the movable flow control plate 68, which allows the flow control plate 68 to move back and forth in alignment parallel with housing main part 65'. A helic compression spring 78 is disposed between the flow control plate 68 and housing main part 65' to resiliently bias the flow control plate 68 away from the housing main part 65'.

Figure 10:
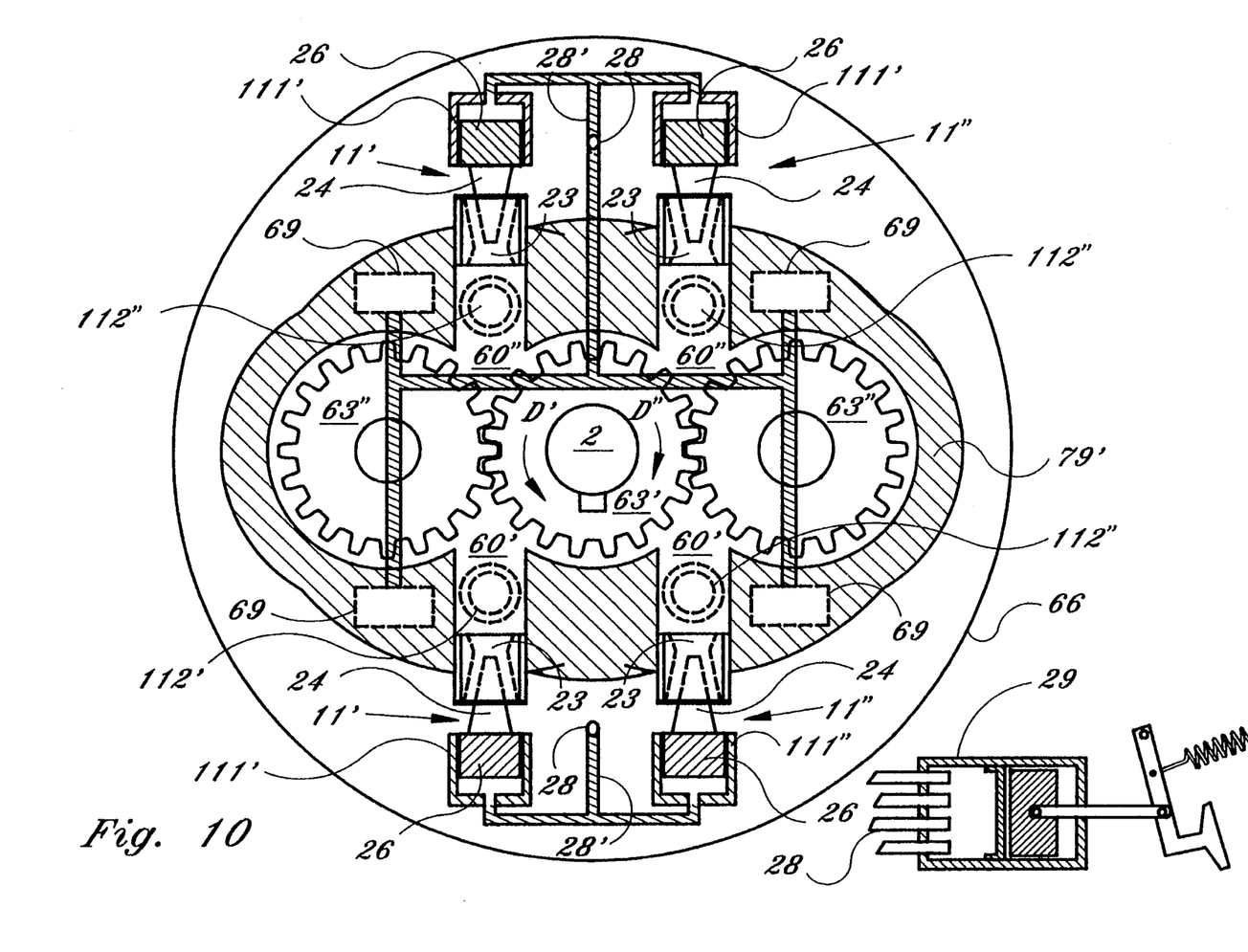
FIG. 10 is a diagrammatic cross-sectional view of a gearwheel pump having three meshing gearwheels for braking in both directions, enclosed in a common fluid-filled pump enclosure.

FIG. 10 shows a version of the gearwheel pump having three meshing gearwheels 63', 63'', and 63''' in a common housing 79. The housing 79 is advantageously constructed similarly to the housing 65 in FIG. 9, with a main housing part 79' and a transversely movable flow control plate, that is transversely controlled by plate control cylinders 69 shown symbolically by phantom lines in FIG. 10. Each pair of gearwheels 63', 63'' and 63', 63''' have a respective pair of ports 60', 60'', all of which are in fluid communication via the fluid-filled interior of the fluid enclosure walls 66 as in FIG. 8 and 9. Each port 60'' is equipped with a respective flow control device 11', 11'', each like device 11 in FIG. 2, and each connected via brake lines 28, 28' with the master cylinder 29. The gearwheel pump according to FIG. 10 provides braking in both directions of rotation as indicated by arrows D' and D" of shaft 2 connected to gearwheel 63'. In direction D' fluid flows via port 60" of gearwheel pair 63' and 63" through flow control device 11', and via port 60' of gear wheel pair 63' and 63'" through flow control device 11". In direction D" fluid flows through port 60" of gearwheel pair 63' and 63'" through flow control device 11" and via port 60' of gear wheel pair 63' and 63" through flow control device 11'.

In the arrangement providing braking in both directions shown in FIG. 10, each of the four gearwheel pump ports 60',,60" are supplemented with a respective flow control device 11' for the gearwheel pair 63",63', and 11" for the gearwheel pair 63', 63". Each of the four flow control devices 11', 11" includes a flow control cylinder 111' for respective gearwheel pair 63" and 63', and 111" for gearwheel pair 63',63'". Each flow control cylinder includes a respective flow control piston 26 having a flow control cone 24 aligned with a respective flow control aperture 23 for throttling the fluid flow from the gearwheel pump when brake fluid from master cylinder 29 via fluid pipes 28,28' is driving each flow control piston forward during braking. In addition each of the four ports 60',60" includes a one-way fluid valve 112' and 112" (shown in phantom lines) which allows fluid to enter the pump ports 60',60" from the surrounding body of hydraulic fluid contained in the enclosure 66. The one-way valves 112',112" are inlet only and prevent vacuum or cavitation from occurring in the pump gear wheels during hard braking. The one-way valves 112' and 112" can advantageously be poppet valves or ball valves that open inward into the fluid ports 60',60".

FIG. 12 shows in detail a a vehicle drive shaft section 2' driving a drive wheel 82' equipped with a hydraulic brake 83' of the version shown in FIG. 2 with the eccentric cams 34 mounted on separate shaft sections 36, with one of these separate shaft sections being the vehicle axle shaft. Detail b shows a vehicle drive shaft 2", also connected with a drive wheel 82, but equipped with a hydraulic brake 83" of the version shown in FIG. 3, wherein the eccentric cams 34 are mounted on a common shaft section 36', which is also the vehicle axle shaft. A differential 81 connects the two drive shafts 2', 2", in conventional manner, with a common power source, not shown.

Figure 13:
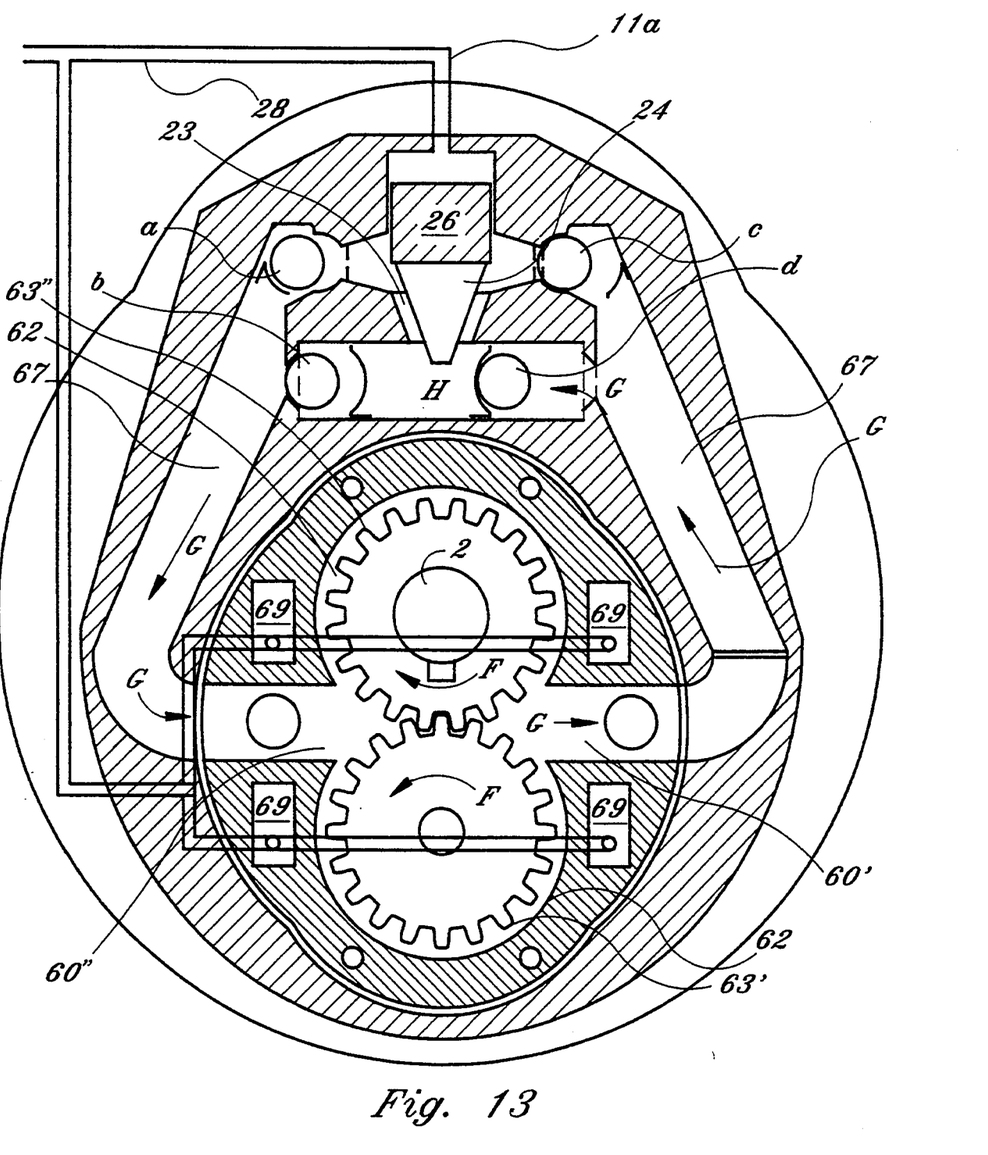
FIG. 13 is a more detailed view of the embodiment according to FIG. 7 and FIG. 8.
Figure 14:
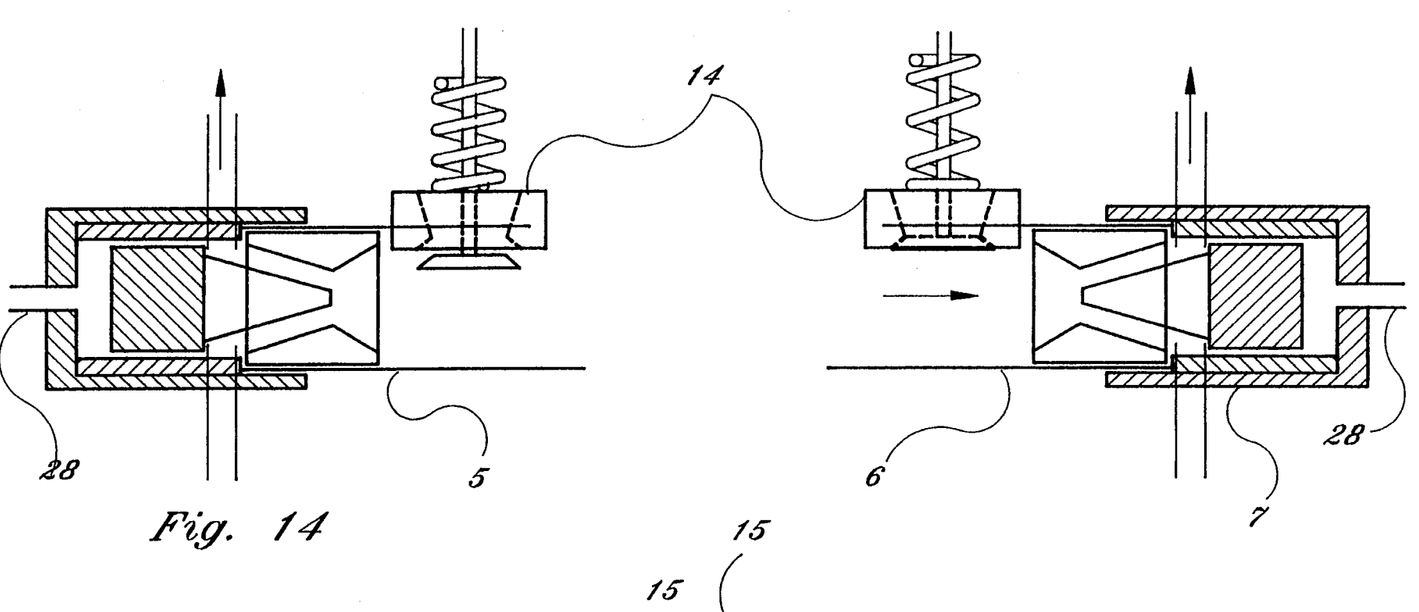
FIGS. 14 and 15 show an embodiment which accomplishes the directional braking.
Figure 15:
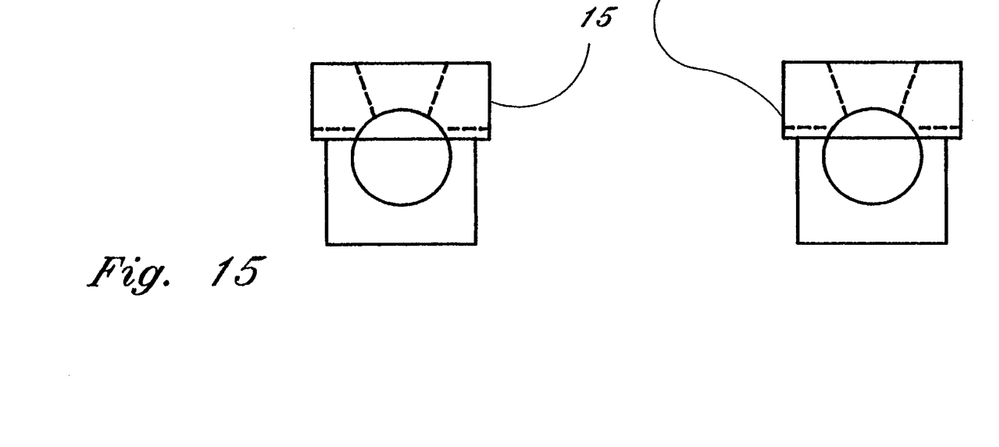

FIG. 13 shows an embodiment of the gearwheel pump substantially as shown in FIG. 7 and FIG. 8, wherein the four one-way fluid valves a,b,c,d, are incorporated into the gearwheel housing and combined with part of the recirculating loop. It follows that by proper adaptation of the housing structure the entire recirculating loop could be incorporated into the housing.

In FIG. 13 same elements are numbered the same as in FIG. 8. The arrows F show the forward direction of rotation of gearwheels 63' and 63", and arrows G show the corresponding direction of fluid flow in the recirculating loop. The one-way valves a–d are shown as ball valves, but could, it follows, be made as any suitable kind of one-way valve. The flow control valve 11a is shown as valve 11 in FIG. 8, and again, could be made as any suitable type of fluid control valve such as, for example, a pilot valve as is well known from the art of hydraulic controls.

As seen in FIG. 13, if the direction of rotation of gearwheels 63',63" is in forward direction, as shown by arrows F, one-way valves a and d would be open, while valves b and c would be closed. If the direction of rotation is reversed, the fluid flow shown by arrows G would be reversed. It follows that in the reverse direction valves a and d would be closed, and valves b and c open, while the flow through flow control valve aperture 23 will remain unchanged, as shown by arrows H.

I claim:

1. A hydraulic brake coupled to a rotary shaft, comprising a hydraulic pump connected to the shaft, the pump having a pump inlet, and pump outlet, a hydraulic loop having an inlet part connected to said pump outlet and an outlet part connected to said pump inlet, flow control means disposed in said hydraulic loop between said inlet part and said outlet part for controlling flow of hydraulic fluid in said hydraulic loop, and a brake master cylinder connected via hydraulic brake line connecting means to the flow control means for controlling the flow of hydraulic fluid in response to operation of said brake master cylinder, wherein said hydraulic pump is a gearwheel pump, said gearwheel pump including a gearwheel housing having a recess, and at least two meshing gearwheels disposed in said gearwheel housing, said pump inlet and pump outlet fluidly communicating with said recess, and wherein said flow control means include adjustable movable flow control device including a flow control piston(26) situated in a flow control cylinder(11a), the flow control piston(26) having a conical end projection(24) in alignment with a flow control aperture(23) so that fluid in said loop and gearwheel pump is throttled by fluid pressure applied via said hydraulic brake line connecting means(28,28') so that braking is exerted on said rotary shaft, and an adjustable flow control means(at 69) separate and distinct from said movable flow control device which adjustable flow control means includes a plate control piston(71) and flow control plate(68), the plate control piston(71) connected by an hydraulic brake line connecting means to said brake master cylinder for forcing said flow control plate(68) thereof toward a gearwheel housing main part for adjusting the spacing between the flow control plate(68) and said main gearwheel housing part and thus adjustably controlling fluid flow, the movable flow control device and the adjustable flow control means substantially simultaneously operable for reducing fluid flow to thus brake said rotary shaft.

2. A hydraulic brake according to claim 1 wherein said flow control means also includes four flow control valves in said recess for adjustably controlling fluid flow in said gearwheel pump.

3. A hydraulic brake according to claim 1, including three meshing gearwheels in said gearwheel pump, said three meshing gearwheels forming two pairs of meshing gearwheels, wherein said two pairs of gearwheels share one of said three gearwheels, each of said two pairs of gearwheels forming a pair of fluidly communicating fluid ports, a pair of flow control means each in fluid communication with a respective one of said pairs of fluid ports, and further brake connecting means connecting each of said flow control means with said brake actuator.

4. A hydraulic brake according to claim 1, including an enclosure for containing said gearwheel pump housing, said enclosure forming an interior space for containing hydraulic fluid.

5. A hydraulic brake according to claim 4, wherein said interior space forms said hydraulic loop.

6. A hydraulic brake according to claim 5, including at least one index pin slidably connecting said gearwheel housing main part with said flow control plate for maintaining said flow control plate in parallel alignment with said gearwheels.

* * * * *